(12) United States Patent
Penzato

(10) Patent No.: US 10,119,418 B2
(45) Date of Patent: Nov. 6, 2018

(54) SPLIT TURBOCHARGER BEARING ASSEMBLY

(71) Applicant: Ford Global Technologies, LLC, Dearborn, MI (US)

(72) Inventor: Sam Penzato, Bath (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/824,839

(22) Filed: Nov. 28, 2017

(65) Prior Publication Data

US 2018/0080342 A1 Mar. 22, 2018

Related U.S. Application Data

(62) Division of application No. 14/936,201, filed on Nov. 9, 2015.

(30) Foreign Application Priority Data

Nov. 17, 2014 (GB) .................................... 1420334.3

(51) Int. Cl.
*F01D 25/16* (2006.01)
*F02C 6/12* (2006.01)
(Continued)

(52) U.S. Cl.
CPC ......... *F01D 25/162* (2013.01); *F01D 21/003* (2013.01); *F02C 6/12* (2013.01); *F02C 7/06* (2013.01); *F04D 29/056* (2013.01); *F05D 2220/40* (2013.01); *F05D 2230/50* (2013.01); *F05D 2240/54* (2013.01);
(Continued)

(58) Field of Classification Search
CPC ........ F01D 21/003; F01D 25/162; F02C 6/12; F02C 7/06; F04D 29/051; F05D 2230/50; F16C 35/067
See application file for complete search history.

(56) References Cited

U.S. PATENT DOCUMENTS 5,884,478 A 3/1999 Edmonds, Jr.
6,354,083 B1 3/2002 Shuttleworth et al.
(Continued)

FOREIGN PATENT DOCUMENTS

DE 3133953 A1 * 5/1982 .............. F02B 37/00
DE 102013001216 A1 7/2014
(Continued)

OTHER PUBLICATIONS

Intellectual Property Office of the United Kingdom, Combined Search and Examination Report Issued in Application No. GB1420334.3, dated May 12, 2015, South Wales, 11 pages.

*Primary Examiner* — Audrey K Bradley
(74) *Attorney, Agent, or Firm* — Julia Voutyras; McCoy Russell LLP

(57) ABSTRACT

A turbocharger bearing assembly of a split turbocharger for an engine is disclosed in which key rotational parts are rotatably supported by a pair of spaced apart bearings located in a bore of a tubular bearing housing forming part of a bearing assembly. The rotational parts of the turbocharger bearing assembly are balanced as a unit before the turbocharger bearing assembly is assembled to a cylinder block of the engine by insertion into a bore formed in the cylinder block.

7 Claims, 7 Drawing Sheets

(51) Int. Cl.
- F02C 7/06 (2006.01)
- F16C 19/54 (2006.01)
- F16C 35/067 (2006.01)
- F04D 29/05 (2006.01)
- F01D 21/00 (2006.01)
- F04D 29/056 (2006.01)
- F16C 19/28 (2006.01)

(52) U.S. Cl.
CPC .......... *F05D 2240/60* (2013.01); *F16C 19/28* (2013.01); *F16C 19/54* (2013.01); *F16C 35/067* (2013.01); *F16C 2360/24* (2013.01)

(56) References Cited

U.S. PATENT DOCUMENTS

| | | |
|---|---|---|
| 7,832,938 B2 | 11/2010 | McKeiman, Jr. |
| 8,667,795 B2 | 3/2014 | Steiner et al. |
| 2004/0202556 A1 | 10/2004 | Svihla et al. |
| 2012/0257966 A1* | 10/2012 | Boening ............... F01D 25/162 415/229 |
| 2012/0279215 A1 | 11/2012 | Roth et al. |
| 2012/0288367 A1* | 11/2012 | Boening ................ F01D 25/14 415/213.1 |
| 2013/0071243 A1* | 3/2013 | Kocher ................... F01D 25/18 415/230 |
| 2013/0291540 A1 | 11/2013 | Serres et al. |
| 2016/0097345 A1 | 4/2016 | Penzato |

FOREIGN PATENT DOCUMENTS

| | | |
|---|---|---|
| GB | 2033962 | 5/1980 |
| GB | 2494145 | 6/2013 |
| JP | S5710732 A | 1/1982 |
| JP | S62162728 A | 7/1987 |
| JP | 2006249945 A | 9/2006 |

* cited by examiner

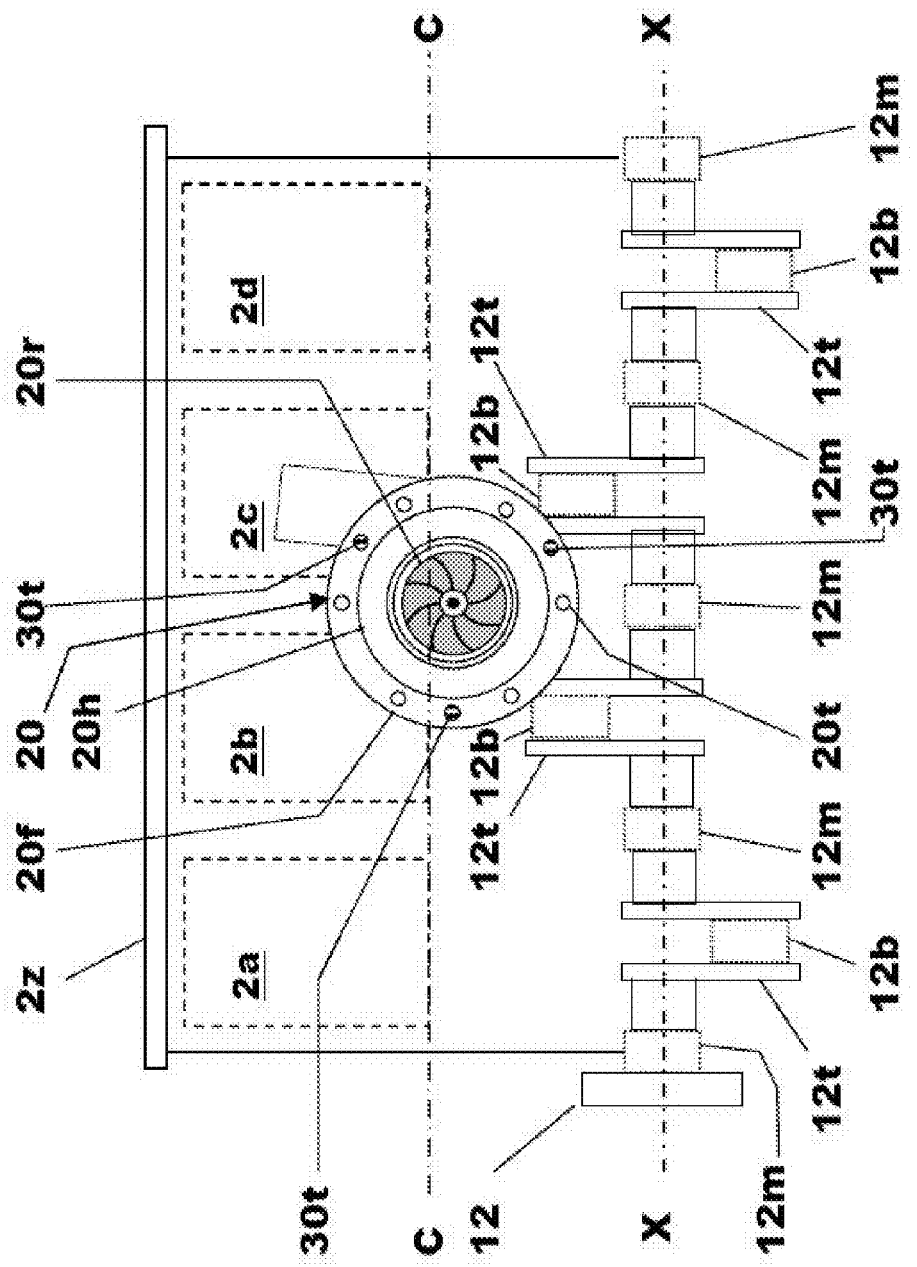

SPLIT TURBOCHARGER BEARING ASSEMBLY

CROSS REFERENCE TO RELATED APPLICATION

The present application is a divisional of U.S. patent application Ser. No. 14/936,201, entitled "A SPLIT TURBOCHARGER BEARING ASSEMBLY," filed on Nov. 9, 2015. U.S. patent application Ser. No. 14/936,201 claims priority to Great Britain Patent Application No. 1420334.3, filed Nov. 17, 2014. The entire contents of the above-reference applications are hereby incorporated by reference in their entirety for all purposes.

FIELD

The present description relates generally to system and assembly of a split turbocharger for a reciprocating piston internal combustion engine.

BACKGROUND/SUMMARY

It is known to provide an internal engine with a turbocharger to pressurize the air entering the engine so as to improve the performance of the engine in terms of torque output, emissions and combustion efficiency. A conventional turbocharger comprises a housing having a rotary compressor rotatably supported in a chamber at one end of the housing and a turbine rotatably supported in a chamber at an opposite end of the housing. The turbine and the compressor are driveably connected via a drive shaft supported by a central bearing part of the housing.

The turbine is arranged to receive exhaust gas from the engine and convert the kinetic energy of the exiting exhaust gas into a rotary driving torque that is supplied to the compressor. The compressor receives a supply of air, which may be ambient air or a combination of ambient air and recycled exhaust gas, compresses the supplied air and supplies the compressed air to the engine.

This arrangement produces a number of issues when packaging the turbocharger within an engine bay of a motor vehicle. Firstly, due to the large length of the ducts used to connect the turbocharger to the engine and the complexity of these ducts, compromises may have to be made. Secondly, a conventional turbocharger represents a relatively large mass that has to be supported on the engine. Thirdly, difficulties in packaging the turbocharger can lead to poor crash performance because the relatively solid turbocharger unit may occupy a space that may be impinged by other components during an impact. Finally, transfer of radiated heat from the engine to the cold compressor side components may occur due to the close proximity and close attachment of the hot turbine part of the turbocharger to the cold compressor part of the turbocharger, leading to heat transfer from the turbine to the compressor, which may result in a number of disadvantages. These disadvantages further include the requirement to use materials for the compressor side components having a better thermal resistance than would otherwise be required resulting in increased material cost. Also, higher charge temperatures from the compressor outlet due to this heating effect results in reduced engine efficiency due to the higher charge air inlet temperatures, reduced efficiency due to a need for increased post compressor cooling (intercooling) and thermal fatigue due to the temperature differential between the hot and cold sides of the turbocharger.

The inventors herein have identified the above issues and identified an approach by which the issues described above may be at least partly addressed. It is an object of the disclosure to provide a design for a bearing assembly for such a split turbocharger that aids assembly of the split turbocharger to the engine and is economical in construction.

According to a first aspect of the disclosure there is provided an example design for a turbocharger bearing assembly of a split turbocharger for an engine. The split turbocharger may have a compressor located on one side of a major structural component of the engine and a turbine located on an opposite side of the major structural component of the engine. The turbocharger bearing assembly comprises a bearing housing having a tubular body defining a bore for housing at least two spaced apart bearings, a drive shaft rotatably supported by the at least two spaced apart bearings, a compressor rotor forming part of the compressor located at one end of the drive shaft for rotation therewith and a turbine rotor forming part of the turbine located at an opposite end of the drive shaft for rotation therewith.

The tubular body may be sized to fit a bore in the major structural component used to mount the turbocharger bearing assembly on the engine. The bearing housing may have a flange located at one end of the tubular body for use in holding the bearing housing in position. The turbocharger bearing assembly may further comprise a housing for the turbine with an integral flange which may be used to secure the turbocharger bearing assembly to the major structural component of the engine.

The turbocharger bearing assembly may further comprise a housing for the compressor having an integral flange which may be used to secure the turbocharger bearing assembly to the major structural component of the engine. The major structural component may be a cylinder block of the engine. Alternatively, the major structural component may be one of a cylinder head of the engine, a crankcase of the engine and a bank of cylinders.

According to a second aspect of the disclosure, there is provided an engine having a crankshaft rotatable about a longitudinal axis of rotation and a split turbocharger comprising a compressor supplying charge air to at least one intake of the engine, a turbine connected to at least one exhaust of the engine and a drive shaft drivingly connecting the compressor to the turbine. The split turbocharger includes a turbocharger bearing assembly constructed in accordance with said first aspect of the disclosure supported by the major structural component of the engine so as to locate the compressor and turbine on opposite sides of the major structural component of the engine.

The compressor may comprise a compressor housing enclosing a working chamber and the compressor rotor may be located in the working chamber. The compressor housing may be mounted on a first longitudinal side of the major structural component of the engine. The turbine may comprise a turbine housing defining a working chamber and the turbine rotor may be located in the working chamber. The turbine housing may be mounted on a second longitudinal side of the major structural component of the engine. The major structural component of the engine may include one or more of a cylinder block, a crankcase, a cylinder head and a bank of cylinders.

In one example, the drive shaft may be arranged at substantially ninety degrees to the longitudinal axis of rotation of the crankshaft.

According to a third aspect of the disclosure a method is provided for assembling a split turbocharger to an engine.

The method comprises assembling a drive shaft, a compressor rotor, a turbine rotor and at least two bearings to a tubular body of a bearing housing to form a turbocharger bearing assembly in accordance with said first aspect of the disclosure. The method further comprises rotating the drive shaft and the attached compressor and turbine rotors at a speed so as to balance the rotating parts and, after completion of the balancing step, fitting and securing the balanced turbocharger bearing assembly to the engine.

The turbocharger bearing assembly may comprise inserting plurality of bearings (at least two bearings) into a bore in the tubular bearing housing and engaging the drive shaft with the bearings so as to rotatably support the drive shaft. The turbocharger bearing assembly may further comprise fastening one of a compressor rotor and a turbine rotor to one end of the drive shaft before it is engaged with the bearings. The turbocharger bearing assembly may still further comprise fastening the other of the compressor rotor and the turbine rotor to an opposite end of the drive shaft after it has been engaged with the bearings.

The method for assembling a split turbocharger to an engine may further comprise fastening a compressor housing to a first side of the large structural component of the engine so as to cover the compressor rotor and form a compressor. The method may still further comprise fastening a turbine housing to a second side of the large structural component of the engine so as to cover the turbine rotor and form a turbine.

Fitting and securing the balanced turbocharger bearing assembly to the engine may comprise engaging the tubular body of the bearing housing with a cylindrical bore formed in the large structural part of the engine and fastening the tubular body in position in the bore.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a side view of the turbocharged engine of FIG.2 as seen in the direction of the arrow V.

DETAILED DESCRIPTION

Figure 1:
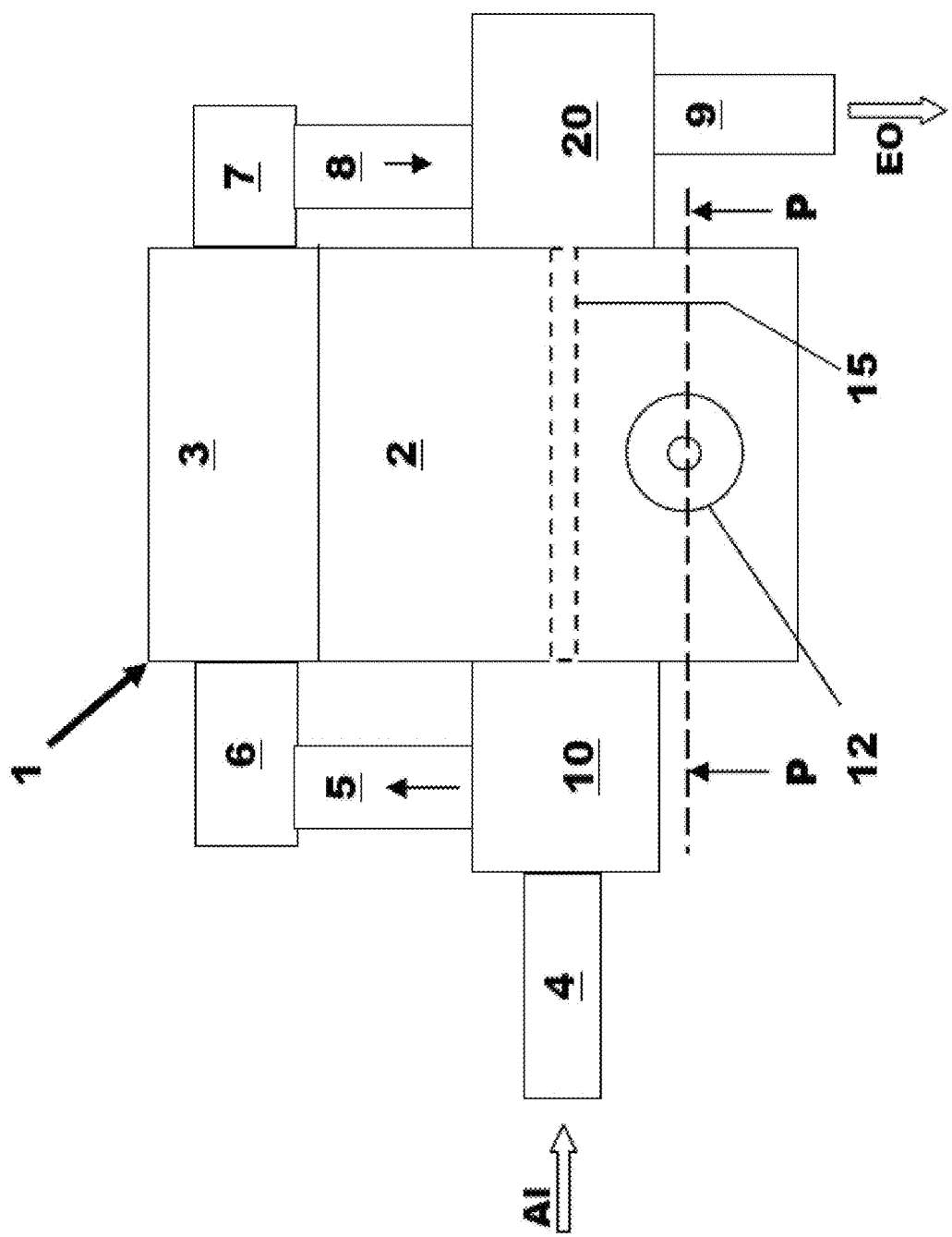
FIG. 1 shows a schematic block diagram of an engine having a split turbocharger in accordance with the disclosure.
Figure 2:
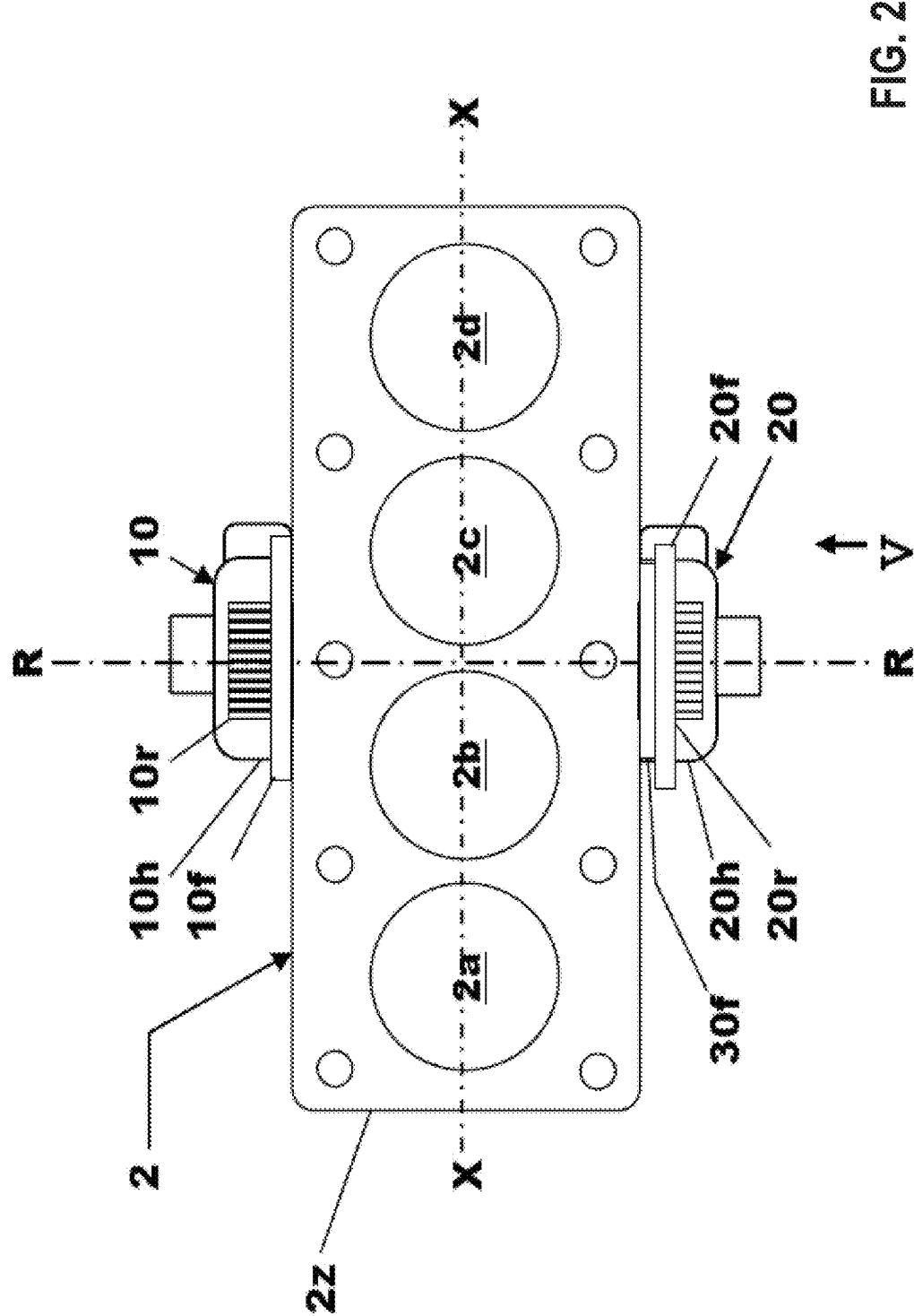
FIG. 2 shows a diagrammatic plan view of the turbocharged engine of FIG. 1 with a cylinder head of the engine removed.

With reference to FIGS. 1 to 5, there is shown an inline four cylinder turbocharged crossflow engine. FIG. 1 shows a schematic block diagram of an engine with a split turbocharger coupled to an engine block. In FIG.2, a top view of the engine is shown with a cylinder head of the engine being removed. A top view of the split turbocharger is also seen in FIG. 2. FIGS. 3A and 3B show a turbocharger bearing assembly of the split turbocharger. FIGS. 4A, 4B, 4C and 4D show four steps followed in coupling the split turbocharger to the engine. FIG. 5 shows a side view of the engine with the split turbocharger coupled to it. The different components of the engine system and the split turbocharger will be discussed in relation to the above mentioned figures.

As shown in FIG. 1, engine 1 comprises an engine block 2 to which is attached a cylinder head 3. The engine block 2 may comprise a cylinder block and crankcase formed as a single component or may have separate cylinder block and crankcase components fastened together. In either case the cylinder block comprises of a plurality of cylinders and in this case there are four cylinders 2a, 2b, 2c, 2d. In each of the cylinders a piston is slidingly supported (not shown).

Charge Air enters the engine 1 as indicated by the arrow 'AI' via an inlet duct 4. It will be appreciated that the inlet charge air could be ambient air or a mixture of ambient air and recirculated exhaust gas. The inducted charge air is drawn into a compressor 10, is compressed by the compressor 10 and is flowed via duct 5 to an inlet manifold 6 connected to inlet ports (not shown) formed in the cylinder head 3 that constitute air intakes for the engine. The charged air is then drawn into the cylinders of the engine 1 and combusted with fuel causing the pistons located in cylinders 2a to 2d of the engine 1 to move in a reciprocating manner to drive a crankshaft 12 before exiting the cylinder head 3 via exhaust passages as exhaust gas into an exhaust manifold 7.

The exhaust gas flows via a duct 8 to a turbine 20 with which it interacts to provide a driving torque to a drive shaft 15 that is drivingly connected at one end to the turbine 20 and is drivingly connected at an opposite end to the compressor 10. The exhaust gas then flows out of the turbine 20 into an exhaust system 9 that may include various after treatment devices for the reduction of noise or emissions and back to atmosphere as indicated by the arrow 'EO'.

Therefore unlike a conventional turbocharger arrangement in the case of a 'split turbocharger' the compressor 10 and the turbine 20 are spaced apart on opposite longitudinal sides of a major structural component of the engine so that the hot exhaust gasses do not compromise the performance of the compressor 10 and allow lower cost materials to be used for the charge air inlet side components. The major structural component of the engine is in this case a cylinder block 2z but could alternatively be a crankcase, a cylinder head or one cylinder block of a V engine referred to herein as a 'bank of cylinders'. By mounting the compressor 10 and the turbine 20 on a crossflow engine in such a manner, the distance between the compressor 10 and the inlet ports of the engine 1 is much reduced compared to a conventional turbocharger mounted on the exhaust side of the engine because the compressor 10 is located close to the intake manifold 6 and the length of any ducts 5 is greatly reduced. In the case of a conventional turbocharger the ducting from the compressor to the inlet side of the engine has to either go around one end of the engine or over the top of the engine. In either case valuable packaging space is taken up and the resulting long duct run results in increased friction losses and reduced compressor efficiency.

The drive shaft 15 may be positioned above the position of the crankshaft 12 but below the lower end of the cylinders 2a to 2d in a cylinder block 2z of the engine block 2. The length of the drive shaft 15 as well as its position within the engine block 1 may significantly reduce the transfer of heat from the turbine 20 to the compressor 10. In alternate embodiments, the drive shaft 15 may be positioned in other locations such as in a crankcase region of the engine 1 between two cylinders or in the cylinder head 3 of the engine.

With reference to FIGS. 2 to 5 the four cylinders 2a to 2d are shown arranged in an inline fashion in an upper part of the engine block 2 referred to as the cylinder block 2z of the engine 1. Although not specifically shown in the figures, the cylinder block 2z includes a number of integral cooling passages and oilways to cool the engine 1 and supply oil to the moving parts of the engine 1. The cylinder block 2z has in addition to two longitudinal sides, a substantially flat face at an upper end to which, in use, the cylinder head 3 is secured as is well known in the art.

At a lower end of the cylinder block 2z a number of support saddles (not shown) are formed for supporting, in this case, five main bearings used to rotatably support the crankshaft 12. In one example, the crankshaft 12 could alternatively be supported by three main bearings. US2014/0041618, for example, shows a four cylinder engine having only three main bearings.

The crankshaft 12 has four throws 12t corresponding to the cylinders 2a to 2d. Each of the throws 12t includes a big end bearing surface or crank pin 12b used for rotatably connecting a connecting rod (not shown) to the crankshaft 12

As seen in FIG. 5 the crankshaft 12 may rotate about a longitudinal axis of rotation X-X defined by main bearings of which bearing journals 12m coupled on the crankshaft 12 form a part. The longitudinal axis of rotation X-X of the crankshaft 12 is perpendicular to a transverse plane P-P (as seen in FIG. 4D) of the engine block 2 and the crankshaft 12 extends in a lengthwise or longitudinal direction of the engine block 2.

Figure 4A:
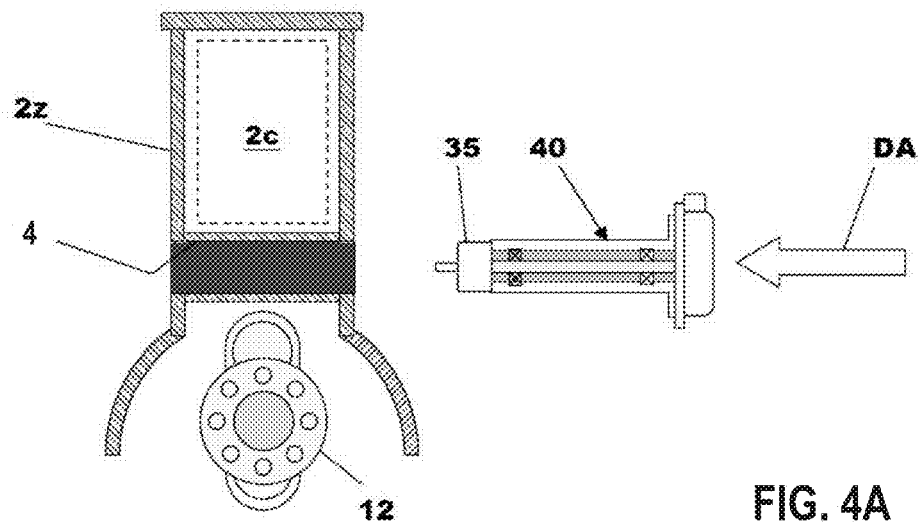
FIG. 4A shows a first step in a method for assembling a split turbocharger to an engine in accordance with the disclosure.
Figure 4B:
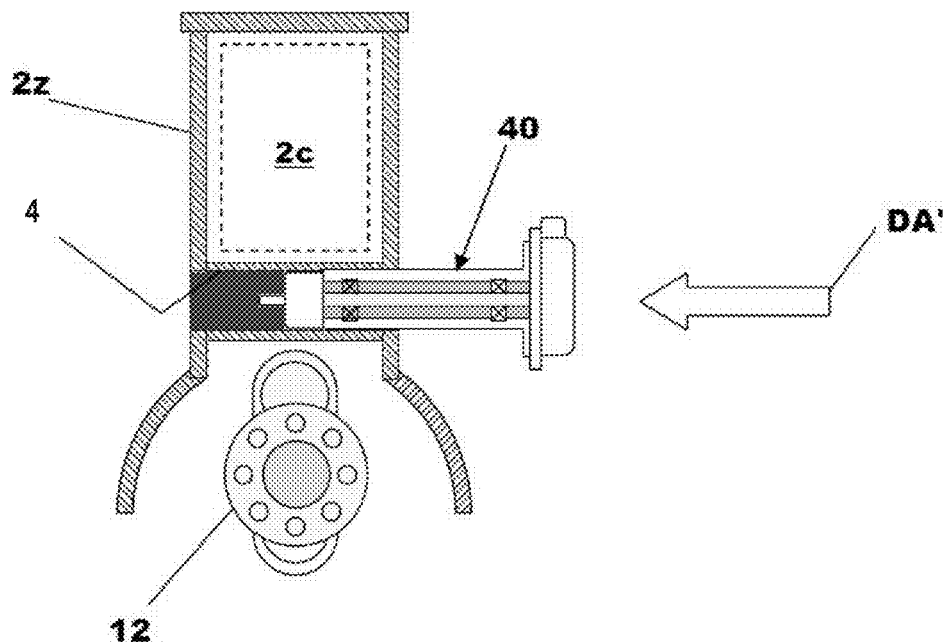
FIG. 4B shows a second step in a method for assembling a split turbocharger to an engine in accordance with the disclosure.
Figure 4C:
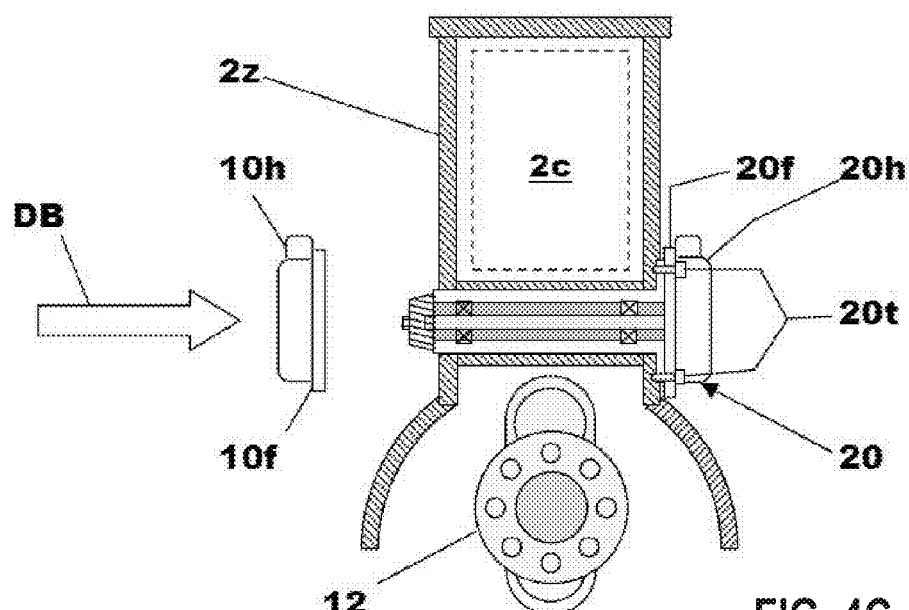
FIG. 4C shows a third step in a method for assembling a split turbocharger to an engine in accordance with the disclosure.
Figure 4D:
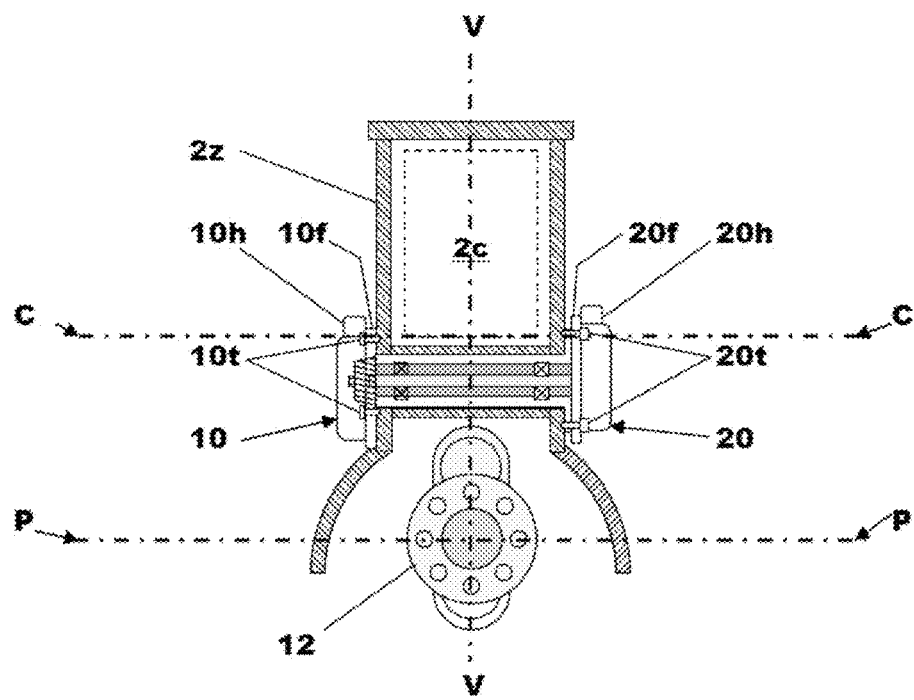
FIG. 4D shows a final step in a method for assembling a split turbocharger to an engine in accordance with the disclosure.

The drive shaft 15 is in this case positioned vertically in a region defined at a lower end by the plane P-P and at an upper end by a plane C-C located at the lower end of the cylinders 2a to 2d (as seen in FIG. 4D). The drive shaft 15 is located close to the plane C-C so as to minimize the distance from the turbine 20 to the exhaust ports of the engine 1. The exact positioning may depend upon a plurality of factors such as the size of the turbine 20 and the available space in the engine compartment. The rotational axis R-R of the drive shaft 15 (as seen in FIG.2) is arranged at substantially ninety degrees with respect to the longitudinal axis of rotation X-X of the crankshaft 12 so that it extends transversely through the engine block 2 from one side of the cylinder block 2z to an opposite side of the cylinder block 2z. The rotational axis R-R of the drive shaft 15 is also arranged at substantially ninety degrees to a vertical plane V-V (as seen in FIG. 4D). It will be appreciated that the cylinder block 2z does not need to be vertically arranged in use and that if rotated from the vertical the orientation of the plane V-V would no longer be vertical.

The drive shaft 15 is located in a longitudinal direction of the engine 1 so that it is aligned with, in this case, a central one of the main bearings 12m of the engine 1. In all cases the longitudinal positioning of the drive shaft 15 must be such that it is offset from the throws 12t of the crankshaft 12 so that no interference occurs with connecting rods (not shown) used to connect the crankshaft 12 to the pistons of the engine 1.

It will be appreciated that, although the drive shaft 15 in the example shown is located between cylinders 2b and 2c, the drive shaft 15 could alternatively be located between cylinders 2a and 2b, between cylinders 2c and 2d or at the longitudinal ends of the engine 1. However, central mounting is advantageous for a crossflow engine as this normally provides the shortest distance between the compressor 10 and the intake manifold 6 and the shortest distance between the exhaust manifold 7 and the turbine 20.

The compressor housing 10h (as seen in FIG. 4D) defines a working chamber in which is rotatably mounted a compressor rotor 10r to form the compressor 10. The compressor housing 10h is mounted on one of the longitudinal sides of the cylinder block 2z by means of an integral flange 10f and a plurality of threaded fasteners 10t. The compressor rotor 10r may be driveably attached to one end of the drive shaft 15. In an alternative embodiment, drive shaft 15 and the compressor rotor 10r may be formed as a single component. On assembly, the compressor housing 10h may enclose the compressor rotor 10r.

The turbine housing 20h (as seen in FIG. 4D) defines a working chamber in which is rotatably mounted a turbine rotor 20r to form the turbine 20. The housing 20h is mounted on the opposite longitudinal side of the cylinder block 2z to the side upon which the compressor housing 10h is mounted and is fastened to the cylinder block 2z by means of an integral flange 20f and a plurality of threaded fasteners 20t. The turbine rotor 20r may be driveably attached to one end of the drive shaft 15. In an alternative embodiment, the drive shaft 15 and the turbine rotor 20r may be formed as a single component. On assembly, the turbine housing 20h may enclose the turbine rotor 20r.

Figure 3A:
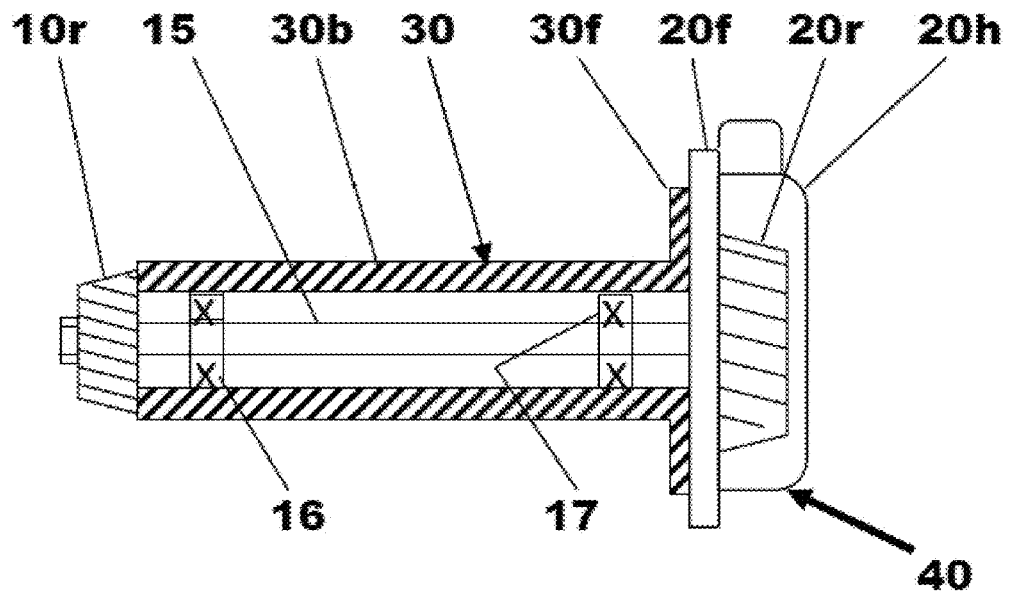
FIG. 3A shows a longitudinal cross-sectional view of a turbocharger bearing assembly in accordance with the disclosure.
Figure 3B:
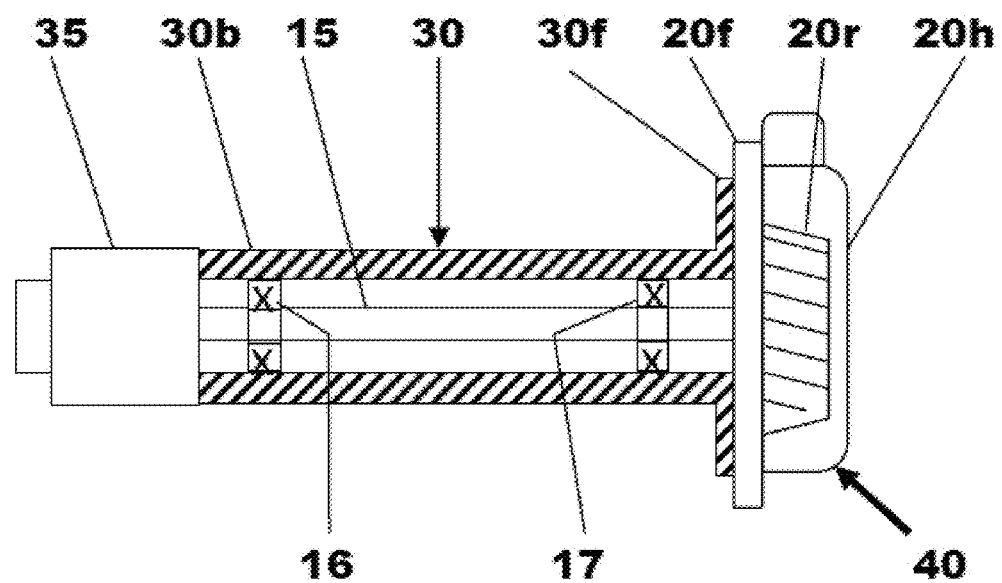
FIG. 3B shows the turbocharger bearing assembly of FIG. 3A with a debris cover in position on one end of the turbocharger bearing assembly.

As seen in FIGS. 3A and 3B, a turbocharger bearing assembly 40 comprises a bearing assembly 30, the drive shaft 15, the compressor rotor 10r and the turbine rotor 20r.

The bearing assembly 30 may further comprise a bearing housing and a pair of spaced apart bearings 16, 17 supported by the bearing housing. The bearing housing is in the form of a tubular body 30b having an end flange 30f for holding the bearing assembly 30 in position on the engine 1.

The tubular body 30b of the bearing assembly 30 defines a bore in which is mounted the pair of bearings in the form of a compressor bearing 16 and a turbine bearing 17. A further intermediate bearing for the drive shaft 15 may be provided if required. In this example, the compressor bearing 16 rotatably supports the drive shaft 15 near to the compressor rotor 10r and the turbine bearing 20r rotatably supports the drive shaft 15 near to the turbine rotor 20r.

The tubular body 30b is supported by the cylinder block 2z and, in this case, is fitted into a transverse cylindrical bore 4 (as seen in FIGS. 4A and 4B) formed in the cylinder block 2z.

In this example, as shown in FIG. 3A, the integral flange 20f attached to the turbine housing 20h may be further attached to the flange 30f of the tubular body 30b of the bearing assembly 30 by three threaded fasteners 30t (as shown in FIG.5) thereby connecting the turbine housing 20h to the bearing assembly 30. In this case the turbine housing 20h forms an additional part of the turbocharger bearing assembly 40 which is then ready for assembly to the engine 1.

The attachment of the turbine housing 20h to the flange 30f has the advantage that the turbine housing 20h prevents damage occurring to the turbine rotor 20r during subsequent assembly processes and prevents the ingress of dirt and debris into the turbine 20. The securing of the turbine housing 20h to the flange 30f in effect creates a sealed turbine structure. Further, a seal can be provided in the flange 30f for co-operation with the drive shaft 15 so as to prevent the egress of hot exhaust gas from the turbine 20 during use.

The turbocharger bearing assembly 40 is in this case fastened to the cylinder block 2z by means of six threaded fasteners 20t that pass through apertures in both the flange 20f of the turbine housing 20h and the flange 30f to engage with complementary threaded bores in the cylinder block 2z. Alternatively, the flange 30f may be fastened directly to the cylinder block 2z and the turbine housing 20h could be fastened to either the flange 30f or directly to the cylinder block 2z.

During the assembly of the turbocharger bearing assembly 40 with the engine 1, as seen in FIG. 3B, a debris cover 35 may be positioned so as to protect the compressor rotor 10r.

The turbocharger bearing assembly 40 may be assembled by inserting the pair of bearings 16, 17 into the bore enclosed by the tubular body 30b and then engaging the shaft 15 with the two bearings 16, 17 with either the turbine rotor 20r or the compressor rotor 10r already in place. In the case of the example shown in FIGS. 3A and 3B, prior to engaging the drive shaft 15 with the bearings 16, 17, the turbine rotor 20r is secured to the drive shaft 15 (or turbine rotor 20r may be formed as a single part with the drive shaft 15). After the shaft 15 is fully engaged with the pair of bearings 16, 17, the compressor rotor 1Or is secured to the drive shaft 15.

One of the advantages of this system is that, by producing a self contained turbocharger bearing assembly 40, the rotary parts of the compressor 10 and the turbine 20 along with the drive shaft 15 can be balanced before the turbocharger bearing assembly 40 is assembled to the engine 1. After balancing there is no need to remove any of the components of the turbocharger bearing assembly 40 and so it is installed on the engine 1 in a balanced state ready for use and requires no subsequent balancing. This is very important because the very high rotational speed of these rotary components will result in unacceptable vibrations arising during use unless the drive shaft 15, the compressor rotor 10r and the turbine rotor 20r are balanced within small limits. Further, after balancing the turbocharger assembly 40 it can be fitted to the engine 1 in a simple and economical manner without disturbing the balance of the rotary components 15, 10r, 20r and without requiring special tools or equipment.

FIGS. 4A to 4D show four steps in the assembly of the split turbocharger to the engine 1. In FIGS. 4A to 4D a longitudinal cross-sectional view of the cylinder block and the crankshaft is seen. A cylindrical bore 4 across the cylinder block 2z may be positioned between cylinders 2b and 2c. FIG.4A, shows a the turbocharger bearing assembly 40 that has been assembled (based on assembling method described in relation to FIGS. 3A and 3B) and balanced and is being moved towards the bore 4 in the cylinder block 2z in the direction as indicated by the arrow DA.

In FIG.4B the tubular body 30b of the bearing assembly 30 forming part of the turbocharger assembly 40 has been engaged with the bore 4 in the cylinder block 2z and the turbocharger bearing assembly 40 is being continued to be moved in the direction of the arrow DA'. The tubular body 30b is sized to fit in the bore 4 such that the bearing assembly 30 is accurately positioned in the cylinder block 2z. It will be appreciated that the bore 4 in the cylinder block 2z can be accurately machined using a conventional boring machine and that the outer diameter and bore of the tubular body 30b can be accurately machined using conventional manufacturing equipment.

In FIG.4C shows the turbocharger bearing assembly 40 fully engaged with the cylinder block 2z. At this stage, the tubular body 30b may completely inserted in to the bore 4. The assembly may be fastened in place by, in the case of this example, by six threaded fasteners 20t. The debris cover 35 may be removed from the compressor rotor 10r As previously mentioned, each of the threaded fasteners 20t extends through a respective aperture (not shown) in the flange 20f on the turbine housing 20h and an aligned respective aperture (not shown) in the flange 30f and is threadingly engaged with a respective threaded aperture formed in the cylinder block 2z.

As shown in FIG. 4C, the compressor housing 10h may be positioned for attachment to the engine 1. Movement of the compressor housing 10h in the direction of the arrow DB will cause it to be moved into position on the cylinder block 2z so as to form a housing and working chamber for the compressor rotor 10r.

In FIG. 4D the assembly of the split turbocharger to the engine 1 is complete and the compressor housing 10h has been fastened in place by a number of threaded fasteners 10t. Each of the threaded fasteners 10t extends through a respective aperture (not shown) in the flange 10f on the compressor housing 10h and is threadingly engaged with a respective threaded aperture formed in the cylinder block 2z.

In this way a turbocharger bearing assembly for a split turbocharger having separate compressor and turbine units that are drivingly connected by a drive shaft extending transversely across an engine, may be assembled. Pre-balancing of the rotating parts of the split turbocharger is possible which thereby aids assembly of the turbocharger to the engine.

It will be appreciated that there could be more than one split turbocharger fitted to an engine and that in such a case each split turbocharger would use a turbocharger bearing assembly constructed in accordance with this disclosure. It will be appreciated that the tubular body of the bearing assembly need not have an end flange and that in such a case an alternative means for holding the tubular body in position may be provided.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 6:
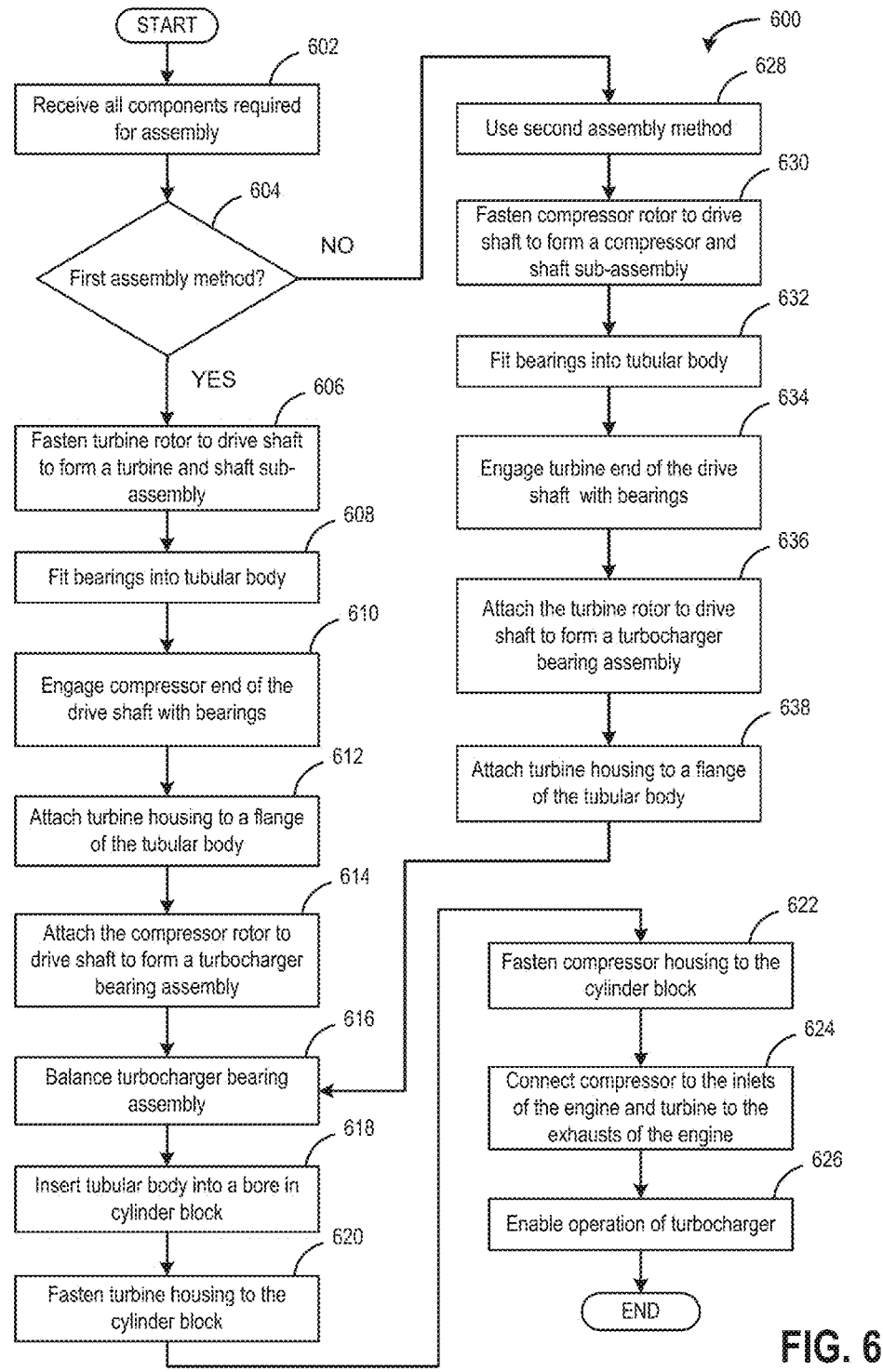
FIG. 6 is a flow chart illustrating an example method for assembling the turbocharger bearing assembly and coupling a split turbocharger to an engine in accordance with the disclosure.

FIG. 6 shows a flow chart illustrating an example method 600 for assembling a turbocharger bearing assembly and coupling a split turbocharger to an engine, such as engine 1 of FIGS. 1-5. At 602, the routine includes receiving all components required for assembly from corresponding manufacturers. The components such as drive shaft, compressor and turbine rotors, compressor and turbine housing and threaded fasteners may be manufactured in house or obtained externally. At 604, the routine includes determining if a first assembly method is to be employed for assembly of the turbocharger bearing assembly. In the first assembly method, the turbine rotor maybe attached to the drive shaft first and the compressor rotor maybe fastened later. In comparison, in a second assembly method, the compressor rotor may be attached to the drive shaft first and the turbine rotor may be fastened later. One of the two methods may be selected based on, for example, component availability, assembly line set-up, convenience of the assemblers, etc.

If it is determined that the first assembly method is to be used, at 606, a turbine rotor may be fastened to a drive shaft. The drive shaft may be enclosed in a tubular body of the bearing assembly. At this stage a turbine and shaft sub assembly may be formed. The turbine rotor may be fastened by means of threaded fasteners. At 608, a pair of bearings may be fitted to a tubular body (bore) of the bearing assembly. The pair of bearings comprise a compressor bearing and a turbine bearing. A further intermediate bearing for the drive shaft may be provided if necessary. At 610, the compressor end (opposite end from the turbine end) of the drive shaft may be engaged to the tubular body of the bearing assembly via the compressor bearings.

An end flange may be coupled to one end of the tubular body. At 612, a turbine housing may be attached to the tubular body. Threaded fasteners may be used to engage a flange of the turbine housing to the flange of the tubular body. On engagement, the turbine housing encloses the turbine rotor. In another example method, compressor end of the drive shaft may be engaged to the tubular body (610) after the attachment of the turbine housing (612) to the tubular body. The turbine housing does not need to be fastened to the tubular body at this stage and may be fitted later in the method such as after balancing or when the turbocharger assembly is in position on the engine. However, it may be advantageous to pre-attach the turbine housing to the tubular body as it provides protection for the turbine rotor during the subsequent assembly processes. At 614, a compressor rotor may be fastened to the drive shaft at the other end from the turbine housing (enclosing the turbine rotor). At this stage, assembly of the turbocharger bearing assembly is complete.

At 604, if it is determined that that the first assembly method may not be used, at 628, the second assembly method may be employed. In this method, at 630, a compressor rotor may be fastened to a drive shaft. At this stage a compressor and shaft sub assembly may be formed. At 632, a pair of bearings may be fitted to a tubular body of the bearing assembly. The pair of bearings comprise a compressor bearing and a turbine bearing. At 634, the turbine end (opposite end from the compressor end) of the drive shaft may be engaged to the tubular body of the bearing assembly via the turbine bearings. At 636, a turbine rotor may be fastened to the drive shaft at the other end from the compressor rotor. At 638, a turbine housing may be attached to the tubular body to enclose the turbine rotor. Threaded fasteners may be used to engage a flange of the turbine housing to the flange of the tubular body. At this stage, assembly of the turbocharger bearing assembly is complete.

From there the routine moves to 616, where the turbocharger bearing assembly may be placed in a balancing machine and rotated at high speed so as to balance the turbocharger bearing assembly. After balancing of the turbocharger bearing assembly is complete, it is ready for coupling to the engine. At 618, the turbocharger bearing assembly may be coupled to the engine by inserting the tubular body of the bearing assembly into a bore in the cylinder block. The size of the bore is manufactured such that the tubular body fits well inside the bore. The bore may be positioned between two central cylinders.

At 620, the flange on the turbine housing may be fastened to one side of the cylinder block by means of threaded fasteners, thereby fastening one end of the turbocharger bearing assembly to the engine block. At 622, a compressor housing may be attached to the turbocharger bearing assembly. A flange of a compressor housing may be fastened to the opposite longitudinal side of the cylinder block by means of threaded fasteners.

At 624, the compressor may be connected to the intake manifold of the engine and the turbine may be connected to the exhaust passage. In this way, a split turbocharger may be assembled and coupled to an engine system. At 626, the assembly is complete and the turbocharger may be enabled to operate based on engine requirement.

The described method 600 relates to the assembly of a split turbocharger to an inline engine in a case where the drive shaft extends through and is fastened to a cylinder block of the engine. If the drive shaft were to be located elsewhere on the engine then it will be appreciated that the method would need to be modified to take account of this by, for example, instead of utilizing cylinder block for coupling the split turbocharger, one of cylinder head and crankcase may be used. Correspondingly, a bore or support would need to be provided in/on those components for the turbocharger bearing assembly.

It will be appreciated that the steps provided in method 600 are provided by way of explanation and that they could appear in a different order or could reflect a different approach.

For example, it would be possible to insert the turbocharger bearing assembly from the turbine rotor end if the dimensions of the tubular body, turbine rotor and bore in the cylinder block were altered from those shown.

One key feature of the disclosure is the production of the turbocharger bearing assembly comprising the bearing assembly including the bearings for the drive shaft, the drive shaft and both rotors that can be balanced prior to assembly to the engine. A further feature of the disclosure is the use of an accurately positioned support for the turbocharger bearing assembly that may be formed in the engine component used to support the split turbocharger without the need for any brackets or subsidiary parts.

The term crossflow engine as meant herein is an engine in which the inlets and exhausts for the engine are on opposite sides of the engine or on opposite sides of each bank of cylinders if the engine has more than one bank of cylinders. With such a crossflow arrangement the flow of gas is from one side of the engine or bank of cylinders through the engine or bank of cylinders to the other side of the engine or bank of cylinders.

In this way, the turbocharger assembly method does not require additional manufacturing stages, tools and actions to ensure the turbocharger bearing assembly is balanced after final assembly. The unit arrives pre-balanced/sealed and will remain so during assembly. Also, as the turbocharger bearing assembly is sealed during assembly, there is less risk of dust/dirt in the atmosphere being transferred to the internal bearing surfaces. In other words, risk of contamination is reduced.

The turbine/compressor wheels are protected during the final assembly sequence. The minimized handling of the components reduces the risk of damage which could unbalance the turbocharger. The technical effect of using the aforementioned assembly process is that by machining and assembling the bearings in a self contained unit (the bearing housing) the physical and logistical difficulties of performing the operation on a main engine structure such as the cylinder block may be overcome. Tight manufacturing tolerances are easier to control in one location by one supplier. Separating manufacture between two suppliers such as, for example a cylinder block supplier and a Turbocharger supplier requires additional quality control steps. The use of a turbocharger bearing assembly which can be considered to be a single component cartridge system allows a much easier process for replacement and does not require additional service tools or control methods should the split turbocharger need to be replaced.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of assembling a split turbocharger on an engine comprising:
    assembling a drive shaft, a compressor rotor, a turbine rotor, and at least two bearings to a tubular body of a bearing housing to form a turbocharger bearing assembly, the tubular body of the bearing housing sized to fit a transverse cylindrical bore through an engine block of the engine, wherein the transverse cylindrical bore is located between a crankshaft of the engine and an engine cylinder and extends from a first side of the engine block to a second side of the engine block opposite the first side;
    rotating the drive shaft and the attached compressor and turbine rotors at a speed to balance rotating parts; and
    after balancing the rotating parts, inserting the balanced turbocharger bearing assembly into the transverse cylindrical bore through the engine and securing the balanced turbocharger bearing assembly to the engine.

2. The method of claim 1, further comprising:
    fastening a compressor housing to the first side of the engine block so as to cover the compressor rotor and form a compressor, the compressor rotor having an outer diameter equal to or smaller than an outer diameter of the tubular body of the bearing housing, and the tubular body of the bearing housing sized to fit through the transverse cylindrical bore through the engine.

3. The method of claim 2, further comprising:
    fastening a turbine housing to the second side of the engine block so as to cover the turbine rotor and form a turbine, the second side located opposite the first side.

4. The method of claim 1, wherein the assembling includes inserting the at least two bearings into a bore in the tubular body of the bearing housing and engaging the drive shaft with the at least two bearings so as to rotatably support the drive shaft.

5. The method of claim 4, wherein inserting the balanced turbocharger bearing assembly through the transverse cylindrical bore through the engine and securing the balanced turbocharger bearing assembly to the engine comprises engaging the tubular body of the bearing housing with the transverse cylindrical bore formed in the engine block, and fastening the tubular body in position in the transverse cylindrical bore, wherein a length of the balanced turbocharger bearing assembly along an axis of rotation of the drive shaft is greater than a length of the transverse cylindrical bore.

6. The method of claim 4, wherein the assembling further includes fastening one of the compressor rotor and the turbine rotor to one end of the drive shaft before it is engaged with the at least two bearings.

7. The method of claim 6, wherein the assembling further includes fastening an other of the compressor rotor and the turbine rotor to an opposite end of the drive shaft after the drive shaft has been engaged with the at least two bearings, the opposite end located opposite the one end having the one of the compressor rotor and the turbine rotor fastened thereto.

* * * * *